United States Patent
Yoshida

(10) Patent No.: US 12,022,045 B2
(45) Date of Patent: Jun. 25, 2024

(54) IMAGE PROCESSING DEVICE, IMAGE PROCESSING METHOD, AND NON-TRANSITORY COMPUTER-READABLE MEDIUM THEREFOR

(71) Applicant: BROTHER KOGYO KABUSHIKI KAISHA, Nagoya (JP)

(72) Inventor: Yasunari Yoshida, Ama (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/475,464

(22) Filed: Sep. 27, 2023

(65) Prior Publication Data

US 2024/0114104 A1    Apr. 4, 2024

(30) Foreign Application Priority Data

Sep. 29, 2022 (JP) .................. 2022-156632

(51) Int. Cl.
*H04N 1/405* (2006.01)

(52) U.S. Cl.
CPC .................. *H04N 1/4052* (2013.01)

(58) Field of Classification Search
CPC ...... H04N 23/90; H04N 23/698; H04N 23/80; H04N 13/239; H04N 17/002; H04N 23/951; H04N 23/45; H04N 23/51; H04N 23/54; H04N 23/57; H04N 23/62; H04N 25/41; H04N 5/2624; H04N 5/2628; H04N 13/246; H04N 13/296; H04N 2013/0081; H04N 13/00; H04N 23/66; H04N 25/531; H04N 5/265; H04N 13/243; H04N 13/271; H04N 23/689; H04N 25/48; H04N 25/76; H04N 19/117; H04N 19/182; H04N 19/60; H04N 23/63; H04N 1/6027; H04N 19/132;
(Continued)

(56) References Cited

U.S. PATENT DOCUMENTS 6,943,918 B1    9/2005  Kakutani
10,343,419 B2 *  7/2019  Kubo .................. B41J 2/2114
(Continued)

FOREIGN PATENT DOCUMENTS

JP    2000-006444 A    1/2000
JP    2004-040303 A    2/2004

*Primary Examiner* — Negussie Worku
(74) *Attorney, Agent, or Firm* — Scully, Scott, Murphy & Presser, PC

(57) ABSTRACT

An image processing device obtains input image data representing an input gradation value for each of multiple pixels, and generates output image data representing a dot formation state for each of the multiple pixels by executing a halftone process with respect to the input image data. The halftone process includes a state selecting process selecting, from among Q+1 dot states, the dot formation state of a pixel of interest among the multiple pixels, the Q being an integer of 2 or more. The Q+1 dot states include a non-dot state Q with-dot states. The state selecting process includes a threshold determining process of determining Q threshold values to be associated with the Q with-dot states. The threshold determining process determines the Q threshold values using multiple parameters including the input gradation values of the pixel of interest and Q reference gradation values to be associated with the Q with-dot states.

11 Claims, 10 Drawing Sheets

(58) Field of Classification Search
CPC ........ H04N 19/167; H04N 19/33; H04N 5/30; H04N 1/4072; H04N 1/52; H04N 19/176; H04N 25/134; H04N 5/145; H04N 1/00795; H04N 1/00806; H04N 1/02845; H04N 1/0285; H04N 1/0303; H04N 1/0305; H04N 1/1017; H04N 1/193; H04N 1/387; H04N 1/393; H04N 1/40; H04N 1/40068; H04N 1/401; H04N 1/4051; H04N 1/4052; H04N 1/4058; H04N 1/409; H04N 1/46; H04N 1/48; H04N 1/6077; H04N 1/6086; H04N 13/106; H04N 13/111; H04N 13/117; H04N 13/156; H04N 13/229; H04N 19/14; H04N 19/86; H04N 2201/044; H04N 2201/326; H04N 23/631; H04N 23/73; H04N 23/741; H04N 23/843; H04N 23/88; H04N 25/583; H04N 25/611; H04N 25/615; H04N 7/01; H04N 7/014; H04N 7/0145; H04N 7/18; H04N 9/646; H04N 9/67; H04N 9/73; H04N 1/40087; H04N 1/6075; H04N 1/62; H04N 1/628; H04N 19/102; H04N 19/124; H04N 19/126; H04N 19/533; H04N 19/80; H04N 21/42202; H04N 21/4318; H04N 23/61; H04N 23/611; H04N 23/633; H04N 23/672; H04N 23/675; H04N 23/676; H04N 23/6812; H04N 23/683; H04N 23/685; H04N 23/687; H04N 23/69; H04N 23/695; H04N 23/71; H04N 23/72; H04N 25/00; H04N 25/42; H04N 25/44; H04N 25/46; H04N 25/63; H04N 25/704; H04N 25/709; H04N 25/778; H04N 5/20; H04N 5/21; H04N 5/32; H04N 5/57; H04N 5/9264; G06T 3/4038; G06T 5/50; G06T 2207/10004; G06T 2207/20128; G06T 2207/20221; G06T 2210/22; G06T 3/14; G06T 3/18; G06T 5/80; G06T 7/344; G06T 5/70; G06T 5/20; G06T 5/92; G06T 7/13; G06T 7/11; G06T 7/337; G06T 7/80; G06T 7/85; G06T 7/62; G06T 2207/10016; G06T 5/40; G06T 7/0002; G06T 2207/20024; G06T 7/0012; G06T 2207/10024; G06T 2207/20012; G06T 2207/20081; G06T 2207/20084; G06T 2207/30252; G06T 5/73; G06T 7/136; G06T 1/00; G06T 2207/10008; G06T 2207/10116; G06T 2207/10132; G06T 2207/20021; G06T 2207/20132; G06T 2207/30004; G06T 2207/30104; G06T 2207/30168; G06T 2207/30176; G06T 2207/30232; G06T 5/90; G06T 5/94; G06T 7/246; G06T 11/003; G06T 11/005; G06T 11/006; G06T 11/60; G06T 2207/20008; G06T 2207/20068; G06T 2207/20182; G06T 2207/20201; G06T 2207/20224; G06T 2211/412; G06T 2211/428; G06T 7/0014; G06T 7/194; G06T 7/269; G06T 7/90; G06T 2207/10068; G06T 2207/10081; G06T 2207/10088; G06T 2207/20076; G06T 2207/20161; G06T 2207/20208; G06T 2207/20216; G06T 2207/30012; G06T 2207/30048; G06T 2207/30068; G06T 2207/30092; G06T 2207/30096; G06T 2207/30108; G06T 2207/30128; G06T 2207/30141; G06T 2207/30172; G06T 2207/30196; G06T 2207/30261; G06T 3/4053; G06T 3/4084; G06T 5/00; G06T 5/30; G06T 5/75; G06T 7/00; G06T 7/0004; G06T 7/001; G06T 7/0016; G06T 7/143; G06T 7/155; G06T 7/174; G06T 7/215; G06T 7/254; G06T 7/64; G06T 7/73; G06T 7/74; G09G 2320/045; G09G 3/3233; G09G 2320/0295; G09G 3/3291; G09G 3/3258; G09G 2300/043; G09G 2300/0819; G09G 2300/0842; G09G 2310/08; G09G 2320/0233; G09G 2320/043; G09G 2360/16; G09G 2300/0426; G09G 2300/0452; G09G 2310/0264; G09G 2320/0257; G09G 2320/0271; G09G 2320/0276; G09G 2320/041; G09G 2320/046; G09G 2320/0626; G09G 2320/0666; G09G 2340/06; G09G 2340/16; G09G 2360/144; G09G 3/006; G09G 3/20; G09G 3/2011; G09G 3/2092; G09G 3/3266; G09G 3/3275; G09G 2300/0861; G09G 2310/027; G09G 2320/0285; G09G 2330/08; G09G 2330/10; G09G 3/3225; G09G 3/325; G06F 18/22; G06F 18/00; G06F 18/214; G06F 16/583; G06F 18/2163; G06F 18/23213; G06F 18/241; G06F 21/316; G06F 21/32; G06F 21/6245; G06F 21/83; G06F 21/88; G06F 2221/2111

USPC ...................................................... 358/1.15
See application file for complete search history.

(56) References Cited

U.S. PATENT DOCUMENTS

| | | | | |
|---|---|---|---|---|
| 2002/0171882 | A1* | 11/2002 | Nagata | H04N 1/4053 358/521 |
| 2004/0001231 | A1 | 1/2004 | Hagai et al. | |
| 2005/0052671 | A1* | 3/2005 | Nishikawa | H04N 1/54 358/1.9 |
| 2010/0245295 | A1* | 9/2010 | Kimpara | G06F 3/042 345/179 |
| 2010/0301111 | A1* | 12/2010 | Nakata | H04N 1/00867 235/375 |
| 2011/0139866 | A1* | 6/2011 | Arakawa | G06T 1/0028 235/375 |
| 2013/0335781 | A1* | 12/2013 | Kuno | H04N 1/4052 358/3.03 |
| 2016/0034797 | A1* | 2/2016 | Yoshida | H04N 1/4052 358/1.9 |
| 2021/0192262 | A1* | 6/2021 | Yamanaka | G06V 30/1444 |

* cited by examiner

PF1 MT: NORMAL PAPER
RS: RS1
L : 6

|   |   | 1 | — | — |
|---|---|---|---|---|
| — | 1 | 2 | 1 | — |
| 1 | 2 | * | — | — |

PF2 MT: NORMAL PAPER
RS: RS2 (> RS1)
L : 12

| 1 | 3 | 5 | 3 | 1 |
|---|---|---|---|---|
| 3 | 5 | 7 | 5 | 3 |
| 5 | 7 | * | — | — |

PF3 MT: GLOSSY PAPER
RS: RS3
L : 10

| — | 1 | 3 | 1 | — |
|---|---|---|---|---|
| 1 | 3 | 5 | 3 | 1 |
| 3 | 5 | * | — | — |

PF4 MT: GLOSSY PAPER
RS: RS4 (> RS3)
L : 18

| — | — | 1 | 3 | 1 | — |
|---|---|---|---|---|---|
| — | 1 | 3 | 5 | 3 | 1 |
| 1 | 3 | 5 | 7 | 5 | 3 | 1 |
| 3 | 5 | 7 | * | — | — | — |

$$\text{ThBCS(Vidx)} = \text{ThBC(Vidx)} + \text{ThBS}$$
$$\text{ThBCM(Vidx)} = \text{ThBC(Vidx)} + \text{ThBM}$$
$$\text{ThBCL(Vidx)} = \text{ThBC(Vidx)} + \text{ThBL}$$

FIG. 7A $$\text{ThBS} = 0$$
$$\text{ThBM} = \text{VS}$$
$$\text{ThBL} = \text{VM}$$

FIG. 7B $$\text{ThBC(Vidx)} = \text{dMax} * \left\{ \text{RtS} * \text{RtM} * \frac{\text{Vidx}}{255} \right. \quad \leftarrow \text{T1}$$
$$+ (1 - \text{RtS}) * \text{RtM} \left(\frac{\text{Vidx}}{255}\right)^{GM1} \quad \leftarrow \text{T2}$$
$$\left. + (1 - \text{RtM}) * \left(\frac{\text{Vidx}}{255}\right)^{GM2} \right\} \quad \leftarrow \text{T3}$$

FIG. 7C $$\text{dMax} = 255$$
$$\text{RtS} = \frac{2 * \text{VS}}{\text{VM}}$$
$$\text{RtM} = \frac{2 * \text{VM}}{\text{VL}}$$
$$\text{GM1} = \sqrt{\frac{\text{VM}}{\text{VS}}}$$
$$\text{GM2} = \sqrt{\frac{\text{VL}}{\text{VM}}}$$

FIG. 7D

```
          S310
           ↓
┌─────────────────────────┐
│   OBTAIN ERROR MATRIX   │── S313
└─────────────────────────┘
           ↓
┌─────────────────────────┐
│ DETERMINE COEFFICIENT dMax │── S316
└─────────────────────────┘
           ↓
          S320
```
FIG. 9
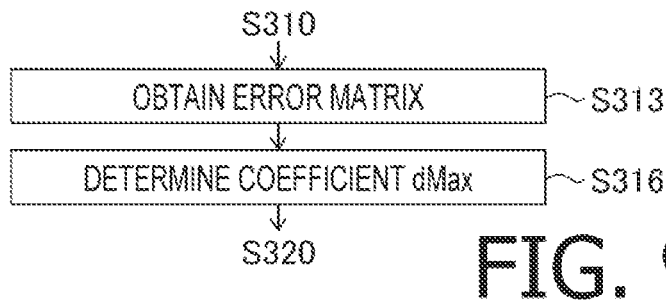
FIG. 10A
$$\underline{PF1} \quad dMax = 255 * \frac{2+2}{1+1+1+1+2+2} * 2 = 255$$
FIG. 10B
$$\underline{PF2} \quad dMax = 255 * \frac{7+7}{1+1+3+3+3+3+5+5+5+5+7+7} * 2 = 148$$
FIG. 10C
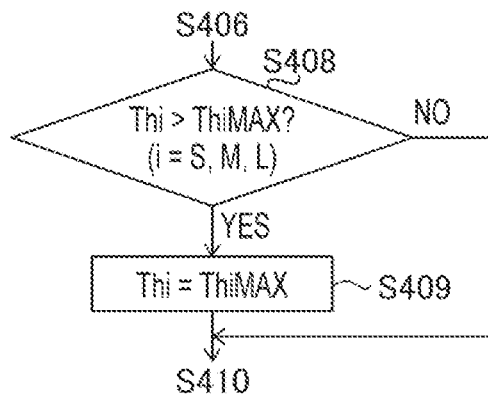
FIG. 11

$$ThBCS(Vidx) = ThBC(Vidx) + ThBS$$
$$ThBCM(Vidx) = ThBC(Vidx) + ThBM$$
$$ThBCL(Vidx) = ThBC(Vidx) + ThBL$$
$$ThBCLL(Vidx) = ThBC(Vidx) + ThBLL$$

FIG. 13A $$ThBS = 0$$
$$ThBM = VS$$
$$ThBL = VM$$
$$ThBLL = VL$$

FIG. 13B $$ThBC(Vidx) = dMax * \left\{ RtS * RtM * RtL * \frac{Vidx}{255} \right. \quad \leftarrow T1d$$
$$+ (1 - RtS) * RtM * RtL * \left(\frac{Vidx}{255}\right)^{GM1} \quad \leftarrow T2d$$
$$+ (1 - RtM) * RtL * \left(\frac{Vidx}{255}\right)^{GM2} \quad \leftarrow T3d$$
$$\left. + (1 - RtL) * \left(\frac{Vidx}{255}\right)^{GM3} \right\} \quad \leftarrow T4d$$

FIG. 13C $$dMax = 255$$
$$RtS = \frac{2 * VS}{VM}$$
$$RtM = \frac{2 * VM}{VL}$$
$$RtL = \frac{2 * VL}{VLL}$$
$$GM1 = \sqrt{\frac{VM}{VS}}$$
$$GM2 = \sqrt{\frac{VL}{VM}}$$
$$GM3 = \sqrt{\frac{VLL}{VL}}$$

FIG. 13D

IMAGE PROCESSING DEVICE, IMAGE PROCESSING METHOD, AND NON-TRANSITORY COMPUTER-READABLE MEDIUM THEREFOR

REFERENCE TO RELATED APPLICATIONS

This application claims priority from Japanese Patent Application No. 2022-156632 filed on Sep. 29, 2022. The entire content of the priority application is incorporated herein by reference.

BACKGROUND ART

The present disclosure relates to an image processing device, an image processing method, and a non-transitory computer-readable medium therefor.

Conventionally, a printing technique to form dots using printing agents such as ink or toner has been used. As a method to control the state of dot formation for each pixel, halftone process such as an error diffusion method is generally used. In order to set a threshold interval used in the error diffusion method, a technique has been proposed to repeatedly set the threshold interval, calculate the large dot rate for each gradation value, and modify the threshold interval for gradation values that do not match the desired large-dot rate.

DESCRIPTION

There was room for ingenuity in determining the threshold used in the halftone process.

According to aspects of the present disclosure, there is provided an image processing device comprising a controller. The controller is configured to perform obtaining input image data representing an input gradation value for each of multiple pixels, and generating output image data representing a dot formation state for each of the multiple pixels by executing a halftone process with respect to the input image data. The halftone process includes a state selecting process of selecting, from among Q+1 dot states, the dot formation state of a pixel of interest among the multiple pixels, the Q being an integer of 2 or more. The Q+1 dot states include a non-dot state indicating no dots and Q with-dot states indicating dots of sizes different from each other. The state selecting process includes a threshold determining process of determining Q threshold values to be associated with the Q with-dot states, calculating a compensated gradation value of the pixel of interest using an input gradation value of the pixel of interest and a first error value indicating an error value distributed to the pixel of interest from L distribution pixels located around the pixel of interest, the L being an integer of 2 or more, selecting the dot formation state of the pixel of interest by comparing the compensated gradation value of the pixel of interest and at least one of the Q threshold values, and calculating a second error value indicating an error value of the pixel of interest using a reference gradation value to be associated with the dot formation state of the pixel of interest from among Q+1 reference gradation values and the compensated gradation value of the pixel of interest, the Q+1 reference gradation values to be associated with the Q+1 dot states. In the threshold determining process, the Q threshold values are determined using multiple parameters including the input gradation values of the pixel of interest and Q reference gradation values to be associated with the Q with-dot states.

FIGS. 5A-5D show examples of profiles.

FIGS. 7A-7D show examples of formulas for calculating threshold values.

FIG. 9 is a flowchart illustrating another example of the threshold table generating process.

FIG. 10A shows an example of a formula for calculating a coefficient dMax.

FIGS. 10B and 10C show other examples of formulas for calculating the coefficient dMax.

FIG. 11 is a flowchart illustrating another example of the error diffusion process.

FIGS. 13A-13D show examples of formulas for calculating threshold values.

A. EMBODIMENT

A1. Configuration of Device

Figure 1:
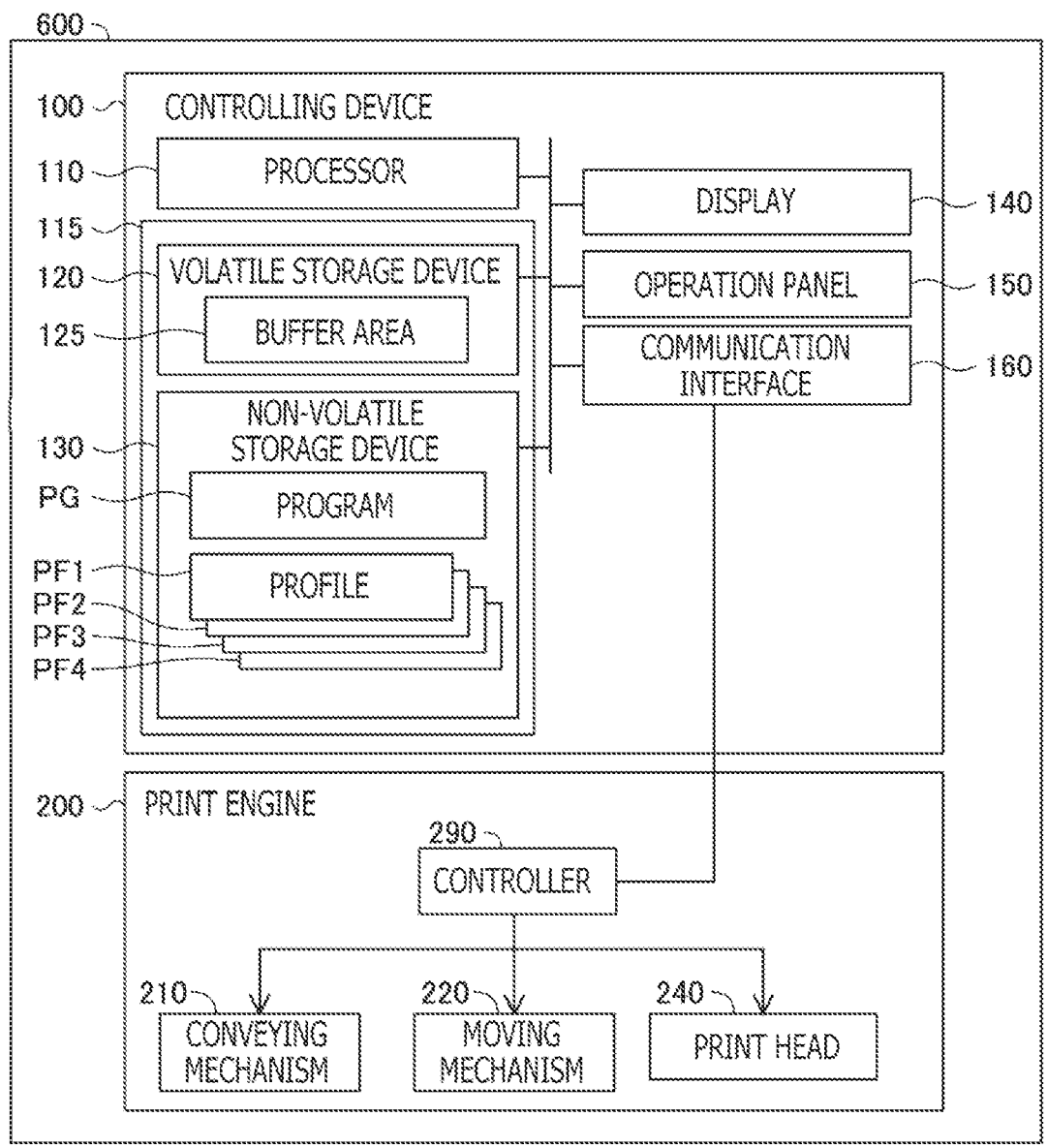
FIG. 1 is a block diagram illustrating a configuration of a printer according to the present disclosure.

FIG. 1 is a block diagram showing a configuration of a printer 600 according to an embodiment. The printer 600 has a controlling device 100 and a print engine 200.

The controlling device 100 has a processor 110, a storage 115, a display 140, an operation panel 150, and a communication interface 160. These components are interconnected via a bus. The storage 115 includes a volatile storage device 120, and a non-volatile storage device 130.

The processor 110 is a device configured to process data. The processor 110 may be, for example, a CPU (central processing unit) or a SoC (system on a chip). The volatile storage device 120 is, for example, a DRAM, and the non-volatile storage device 130 is, for example, a flash memory. The non-volatile storage device 130 stores data of a program PG and data of multiple profiles PF1-PF4. The program PG and the data for profiles PF1-PF4 are stored in advance by a manufacturer of the printer 600 as firmware in the non-volatile storage device 130. The processor 110 executes various processes as described below by executing the program PG. The profiles PF1-PF4 indicate the print settings for each print mode, details of which will be described later. In the volatile storage device 120, a buffer area 125 is provided. As will be described later, the buffer area 125 stores an error value that is calculated according to an error diffusion method. The buffer area 125 may be provided in the non-volatile storage device 130.

The display 140 is a device configured to display images, such as an LCD or an organic EL display. The operation panel 150 is a device for receiving operations by a user, and is configured to include, for example, buttons, levers and a touch panel arranged overlaid on the display 140. The user can input various instructions to the controlling device 100 by operating the operation panel 150. The communication interface 160 is an interface enabling the printer 600 to communicate with other devices. The communication interface 160 includes, for example, one or more of a USB interface, a wired LAN interface, and an IEEE 802.11 wireless interface. The print engine 200 is connected to the communication interface 160.

The print engine 200 is a device configured to print images on printing sheets (an example of printing medium) according to a particular method (e.g., a laser or inkjet printing method) using printing material. In the present embodiment, the print engine 200 is an inkjet printing device configured to print color images using four types of ink, which are black (K) ink, cyan (C) ink, magenta (M) ink and yellow (Y) ink.

The print engine 200 has a conveying mechanism 210, a moving mechanism 220, a print head 240, and a controller 290 configured to control the print engine 200. The conveying mechanism 10 is equipped with a conveying motor (not shown) and uses the power of the conveying motor to convey the printing sheet along a particular conveying path. The moving mechanism 220 is equipped with a moving motor (not shown) and uses the power of the moving motor to reciprocate the print head 240 in a moving direction that intersects a conveying direction of the printing sheet. The print head 240 has a group of nozzles for each of KCMY ink (not shown). The controller 290 may include, for example, one or both of dedicated electrical circuits (e.g., an Application Specific Integrated Circuit (ASIC)) and a computer. The controller 290 supplies drive signals to the print head 240 to drive the print head 240 while the moving mechanism 220 is moving the print head 240. The print head 240 is configured to eject ink from nozzles to form dots on the printing sheet according to a drive signal. A process of forming dots on the printing sheet with moving the print head 240 is also referred to as a pass process. The processor 110 of the controlling device 100 causes the print engine 200 to repeatedly perform the pass process and a conveying process of having the conveying mechanism 210 convey the printing sheet.

A2. Printing Process

Figure 2:
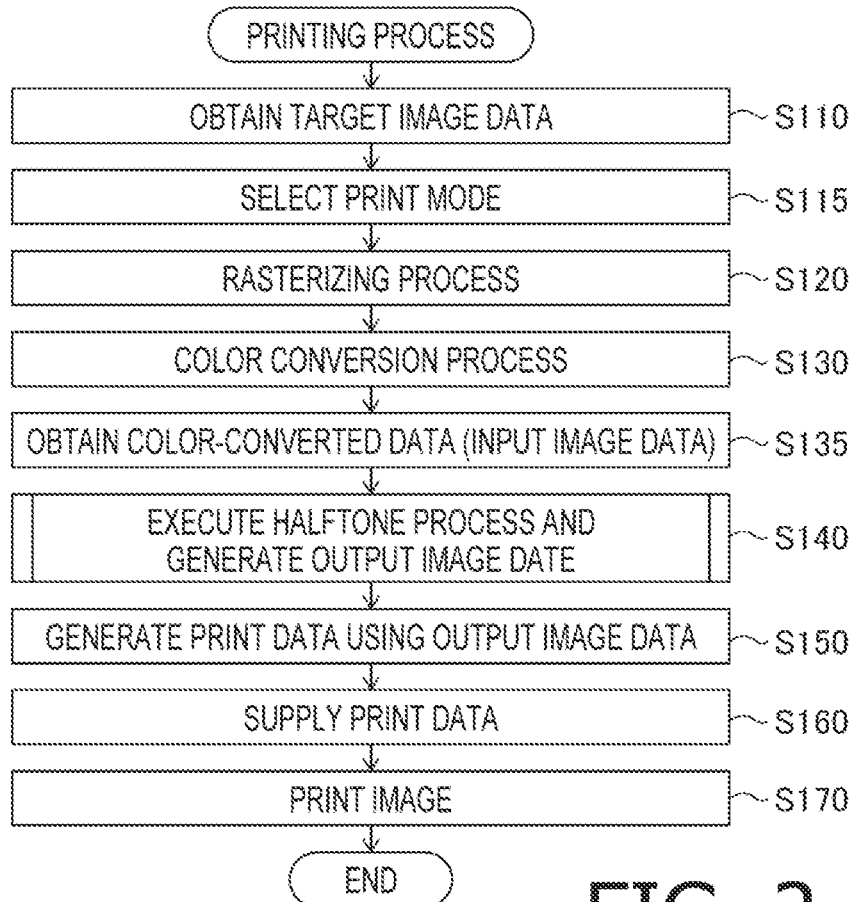
FIG. 2 is a flowchart illustrating an example of a printing process.

FIG. 2 is a flowchart illustrating the printing process. The processor 110 (FIG. 1) of the controlling device 100 executes the printing process according to the program PG in response to a print instruction that is input to the controlling device 100 (FIG. 1). The input method for print instructions may be any method. In the present embodiment, the user inputs print instructions by operating the operation panel 150. The print instruction contains target data information that specifies a target image data, which is the data of a target image to be printed, and mode information that specifies a print mode. The target data information may designate target image data to be stored in various storage devices, such as the storage 115 (e.g., the non-volatile storage device 130), a storage device (e.g., a USB flash drive, not shown) connected to the communication interface 160, a storage device of a communication device configured to communicate with the controlling device 100, and the like. The print mode can be selected from among four print modes of "normal paper, and low resolution," "normal paper, and high resolution," "glossy paper, and low resolution," and "glossy paper, and high resolution," according to the present embodiment. The user may input print instructions to the controlling device 100 through a terminal device (e.g., a smartphone, a tablet computer, or the like; not shown), which is configured to communicate with the controlling device 100.

In S110, the processor 110 obtains the target image data in response to a print instruction. In S115, the processor 110 selects a print mode in response to the print instruction. The print mode as selected is hereafter referred to as a target print mode.

In S120, the processor 110 uses the target image data to generate raster data having a resolution suitable for printing. The target image data may be vector data containing drawing commands for drawing an object. In this case, the processor 110 may generate raster data by rendering vector data (also known as rasterizing). When the target image data is bitmap data, the processor 110 may generate raster data by resolution conversion of the bitmap data. The processor 110 stores the raster data in the storage 115 (e.g., the non-volatile storage device 130).

In S130, the processor 110 obtains the raster data from the storage 115 and executes a color conversion process on the raster data. The color conversion process is a process of converting a color value of each pixel from a color value in a pre-conversion color space (in the present embodiment, an RGB color space) to a color value in a printing color space, which is a color space for printing. The printing color space is a color space represented by color components corresponding to the inks used by the print engine 200. In the present embodiment, the color space is a KCMY color space. A correspondence between the color values in the pre-conversion color space and the color values in the printing color space is determined in advance. The processor 110 stores the color-converted raster data in the storage 115 (e.g., the non-volatile storage device 130).

In S135, the processor 110 obtains the color-converted raster data from the storage 115. The data obtained as above is the data to be subjected to a halftone process. The data subjected to the halftone process will be referred to as input image data. In S140, the processor 110 uses the input image data and performs the halftone process to generate output image data. The processor 110 stores the thus generated output image data in the storage 115 (e.g., the non-volatile storage device (non-volatile storage device) 130).

In the halftone process according to the present embodiment, the processor 110 determines a dot formation state for each pixel by selecting one of a plurality of dot formation states, including a non-dot state and a with-dot state, in accordance with an error diffusion method. In the present embodiment, as the with-dot state, three with-dot states, which respectively correspond to a small dot, a medium dot and a large dot, are available. Details of the halftone process will be described later.

In S150, the processor 110 obtains output image data from the storage 115 and generates the printing data based on the output image data. The print data is data expressed in a data format that can be interpreted by the controller 290 of the print engine 200. The processor 110 generates the print data by, for example, arranging the data representing the dot formation status in the order used for printing, and by further adding a printer control code and a data identification code.

In S160, the processor 110 supplies the print data to the print engine 200. In S170, the controller 290 of the print engine 200 prints the image in accordance with the print data. With the above, the printing process shown in FIG. 2 is completed.

A3. Halftone Process

Figure 3:
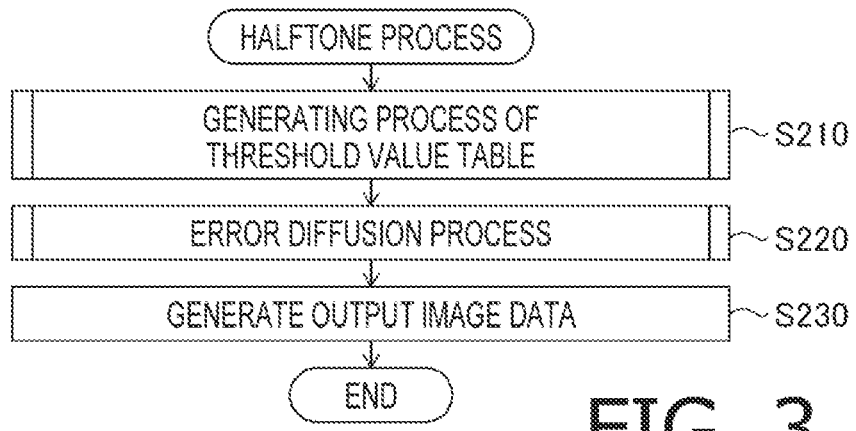
FIG. 3 is a flowchart illustrating an example of a halftone process.

FIG. 3 is a flowchart illustrating the halftone process. In S210, the processor 110 performs a process of generating a threshold table. The threshold table is a table of threshold values used in the error diffusion method.

Figure 4:
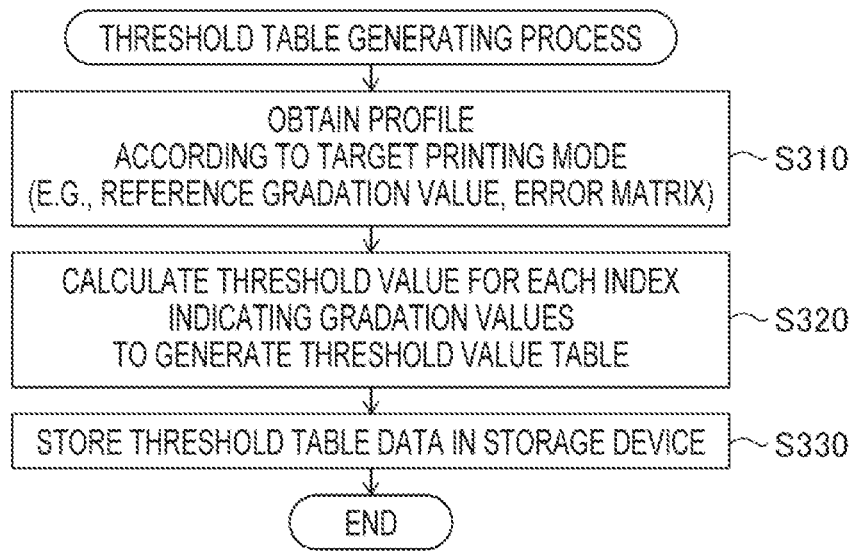
FIG. 4 is a flowchart illustrating a threshold table generating process.

FIG. 4 is a flowchart illustrating a threshold table generating process. In S310, the processor 110 (FIG. 1) obtains the data of the profile to be associated with the target print mode from the storage 115 (in this example, the non-volatile storage device 130). In the present embodiment, print settings for respective print modes are managed using profiles.

FIGS. 5A-5D illustrate multiple profiles, respectively. The profiles and the multiple print modes are related as follows.

First Profile PF1: Normal Paper, Low Resolution RS1
Second Profile PF2: Normal Paper, High Resolution RS2
Third Profile PF3: Glossy Paper, Low Resolution RS3
Fourth Profile PF4: Glossy Paper, High Resolution RS4

Each of the profiles PF1-PF4 represents a recording medium type MT, a print resolution RS (unit is, for example, dpi), an error matrix MX, and reference gradation values VS, VM and VL.

The error matrix MX is a matrix used in the error diffusion method. Dx (horizontal) and Dy (vertical) directions in the drawings indicate directions in which the multiple pixels in the input image are arranged. In the present embodiment, the input image data represents the KCMY gradation values of multiple pixels arranged in a matrix aligned in the Dx and Dy directions. The error matrix MX defines a weight W for a pixel PX located at a particular relative position around the pixel of interest PXi. A number assigned to the pixel PX indicates the weight W. A hyphen assigned to a pixel PX indicates that the weight W is zero.

A pixel PXe is a pixel with a weight W greater than zero (hereinafter, referred to as a distribution pixel PXe). The pixel of interest PXi is given the sum of the error values of the surrounding distribution pixels PXe multiplied by the distribution percentages determined by the error matrix MX. In the present embodiment, the distribution percentage of a distribution pixel PXe is a ratio of the weight W of the distribution pixel PXe to the sum of the weights W determined by the error matrix MX (note that the sum of multiple distribution ratios of multiple distribution pixels PXe is 1). The total number L in each of FIGS. 5A-5D is the total number of distribution pixels PXe. In the present embodiment, when the recording medium type MT is the same, the higher the print resolution RS is, the larger the total number L is.

The reference gradation values VS, VM and VL indicate the gradation values corresponding to the density of small, medium, and large dots, respectively. The larger the dot size is, the higher the density is (i.e., VS<VM<VL). Such a reference gradation value is also called as a relative density value. As will be described later, an error value for the pixel of interest is calculated using the reference gradation value that corresponds to the size of the dot. Although not shown in the drawings, the reference gradation value in the non-dot state is zero regardless of the print mode.

The error matrices MX1-MX4 and the reference gradation values VS1-VS4, VM1-VM4 and VL1-VL4 for each profile PF1-PF4 are determined experimentally in advance in order that images are printed properly in each print mode.

Figure 6:
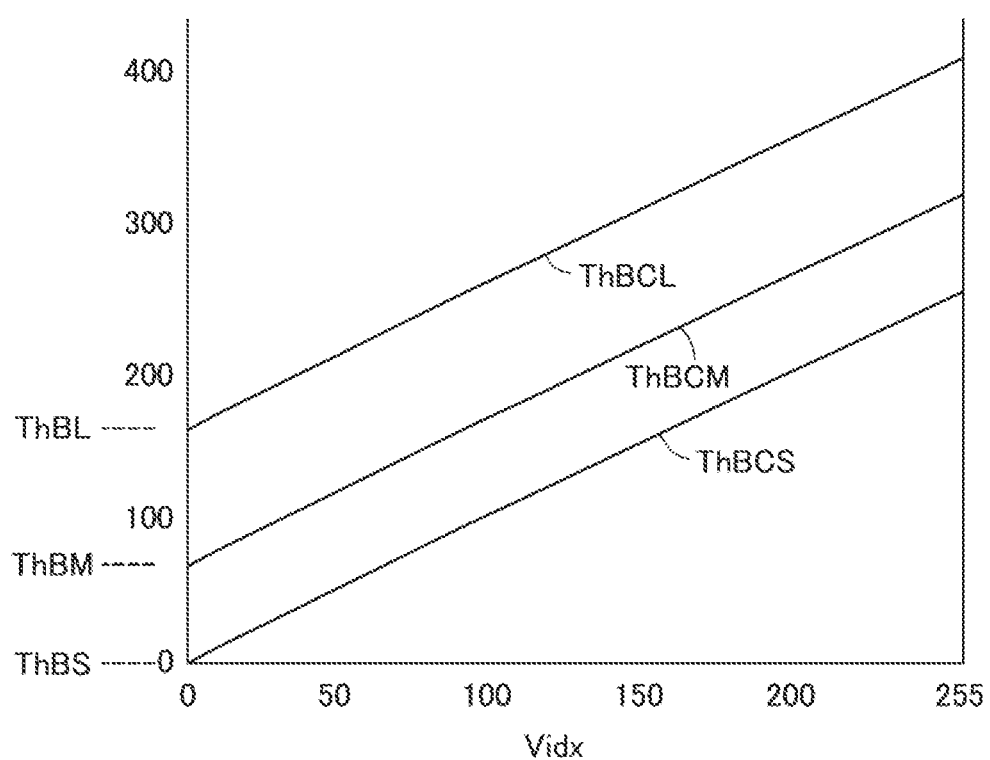
FIG. 6 is a graph showing an example of a threshold table.

In S320 (FIG. 4), the processor 110 generates a threshold table by calculating a threshold value for each of the multiple values of the gradation values. FIG. 6 shows an example of the threshold table. A horizontal axis indicates an index Vidx corresponding to a gradation value, and a vertical axis indicates a threshold value. Thresholds ThBCS, ThBCM and ThBCL indicate thresholds for small, medium, and large dots, respectively (hereafter referred to as a small threshold ThBCS, a medium threshold ThBCM, and a large threshold ThBCL). In the present embodiment, the gradation value (gradation value) of the input image data is represented by 256 gradations between zero and 255. The threshold value applied to the pixel of interest varies according to the gradation value of the pixel of interest. The index Vidx corresponds to the gradation value of the pixel of interest.

As shown in FIG. 6, when Vidx=0, ThBCS=ThBS, ThBCM=ThBM and ThBCL=ThBL. As the index Vidx increases, the threshold values ThBCS, ThBCM and ThBCL also increase. As described above, when the gradation value of the pixel of interest is small (i.e., when the density is low), the dot formation state is determined according to the small threshold value. When the gradation value of the pixel of interest is large (i.e., when the density is high), the dot formation state is determined according to the large threshold value. Therefore, difference in ease of dot formation between high-density and low-density areas in the image can be reduced.

Various methods could be used to calculate the threshold values ThBCS, ThBCM and ThBCL. In the present embodiment, the processor 110 calculates the threshold values ThBCS, ThBCM and ThBCL according to predetermined formulas. FIG. 7A-7D show examples of threshold calculation formulas. As shown in FIG. 7A, the threshold values ThBCS (Vidx), ThBCM (Vidx) and ThBCL (Vidx) are expressed as the sum of a common component ThBC (Vidx) and individual components ThBS, ThBM and ThBL. In the present embodiment, the common component ThBC (Vidx) =0 when Vidx=0. Therefore, the individual components ThBS, ThBM and ThBL represent threshold values at Vidx=0 (FIG. 6). In the present embodiment, as shown in FIG. 7B, ThBS=0, ThBM=VS and ThBL=VM. As described above, according to the present embodiment, the individual components ThBS, ThBM and ThBL are the same as the reference gradation values (0, VS, VM) for the dot sizes that are smaller by one step. Thus, in the present embodiment, the individual components ThBS, ThBM and ThBL are the same as the reference gradation values (0, VS and VM) for the dot sizes one step smaller.

As shown in FIG. 7C, the common component ThBC (Vidx) is calculated by multiplying the sum of three terms T1, T2 and T3 by the coefficient dMax. As shown in FIG. 7D, in the present embodiment, the coefficient dMax is a constant (in this case, 255).

The first term T1 is expressed as a product of ratios RtS and RtM, and an index ratio (Vidx/255). As shown in FIG. 7D, the first ratio RtS is twice the ratio (VS/VM) of the reference gradation values VS and VM. The second ratio RtM is twice the ratio (VM/VL) of reference gradation values VM and VL.

The second term T2 shown in FIG. 7C is expressed as a product of (1−RtS), RtM, and a power of the index ratio (Vidx/255) (the exponent being a first exponent GM1). As shown in FIG. 7D, the first exponent GM1 is a square root of a ratio (VM/VS) of the reference gradation values VM and VS.

The third term T3 shown in FIG. 7C is expressed as a product of (1−RtM) and a power of the index ratio (Vidx/255) (the exponent being a second exponent GM2). As shown in FIG. 7D, the second exponent GM2 is a square root of a ratio (VL/VM) of the reference gradation values VL and VM.

The power of the index ratio (Vidx/255) (the exponent of the first term T1 being 1) included in the three terms T1, T2 and T3 could vary the common component ThBC according to the index Vidx, similar to the tone curve of the so-called gamma correction. The exponents of power (1, GM1, GM2) are not limited to the values indicated in FIG. 7D, and may be adjusted in the same way as the gamma correction exponents.

Parameters of the formulas (e.g., the indices GM1, GM2, the reference gradation values VS, VM, VL, and the like) could vary depending on the print mode. Further, the parameters of the formulas could also be adjusted in order to design appropriate thresholds. When the parameters of the formulas are varied, the common component ThBC, and thus the threshold values ThBCS, ThBCM and ThBCL, are varied. It should be noted that the threshold values could vary to inappropriate values (e.g., values that are too large). In the present embodiment, in the three terms T1, T2 and T3, the coefficients that are multiplied to the power of the index ratio (Vidx/255) are (RtS*RtM), (1−RtS)*RtM and (1−RtM).

In S320 (FIG. 4), the processor 110 calculates the threshold ThBCS, ThBCM and ThBCL for each of the multiple values of the index Vidx (in this case, 256 integers from zero to 255). In S330, the processor 110 stores data representing the correspondence between the index Vidx and the threshold values ThBCS, ThBCM and ThBCL (i.e., the threshold table) in the storage 115 (e.g., the non-volatile storage device 130). Then, the processor 110 terminates the process of FIG. 4, i.e., S210 of FIG. 3.

Figure 8:
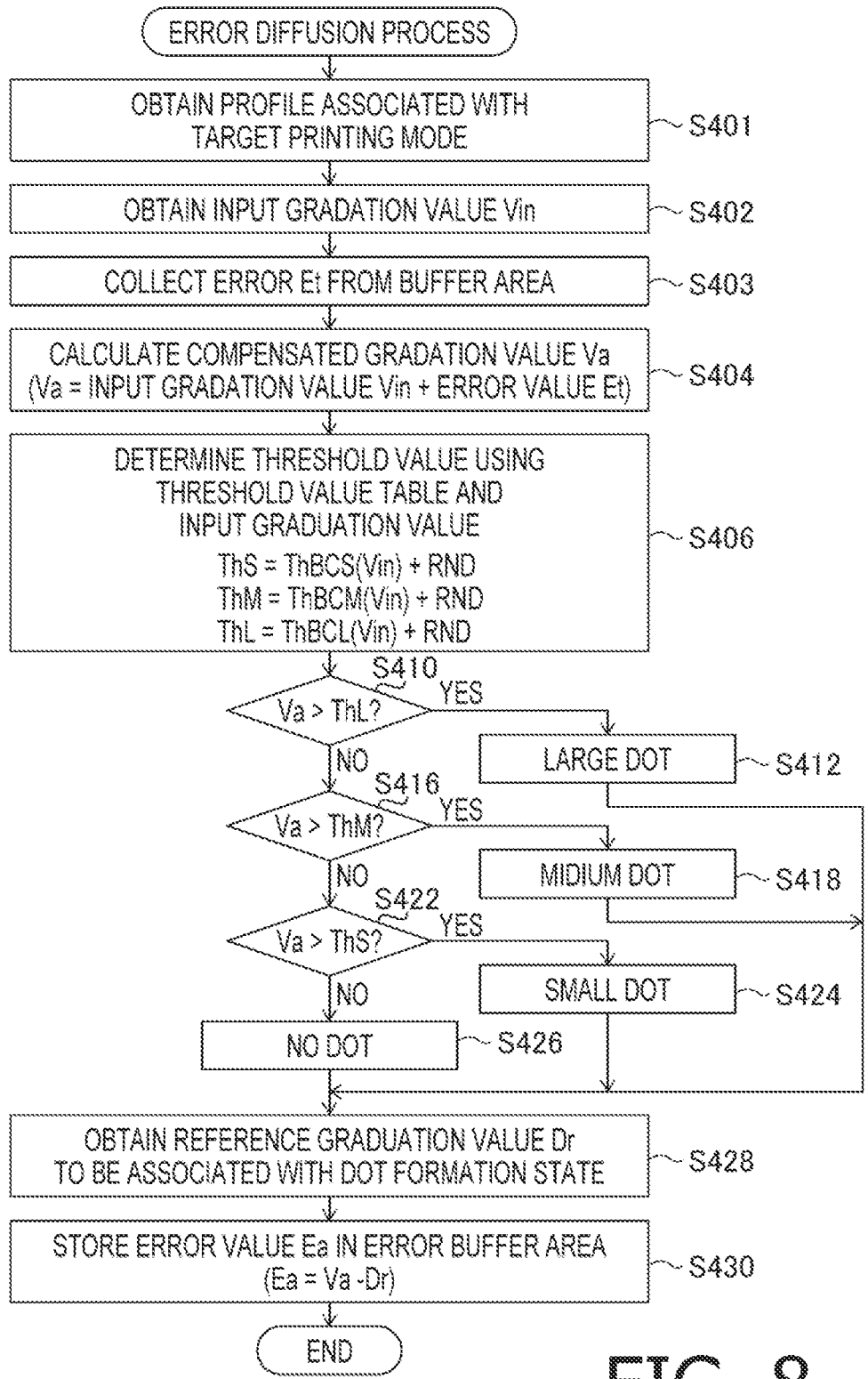
FIG. 8 is a flowchart illustrating an example of an error diffusion process.

In S220, the processor 110 performs an error diffusion process. FIG. 8 is a flowchart illustrating an example of the error diffusion process. The error diffusion process is performed for each of the KCMY (i.e., black, cyan, magenta, and yellow) color components. The error diffusion process for a single color component is performed on a per pixel basis. The process in FIG. 8 illustrates a process for a single pixel of a single color component. The processor 110 performs an error diffusion process for one pixel line extending in the horizontal direction by performing an error diffusion process for one pixel along the Dx direction. When the error diffusion process for one pixel line is completed, the processor 110 executes the error diffusion process for another adjacent pixel line in the Dy direction. It should be noted that the order in which the pixels are processed may be in any other order.

Hereafter, the pixel subject to the error diffusion process is referred to as the pixel of interest. In S401, the processor 110 obtains the data for a profile to be associated with a target printing mode from the storage 115 (the non-volatile storage device 130 in the present embodiment). In S402, the processor 110 refers to the input image data to obtain the input gradation value Vin, which is the gradation value of the pixel of interest.

In S403, the processor 110 calculates a distribution error value Et for the pixel of interest by collecting the errors stored in a buffer area 125 (FIG. 1) using the error matrix MX (FIG. 5A-FIG. 5D), which is determined by the profile. In the buffer area 125, the error values generated in the pixels that have been subjected to the error diffusion process are stored for each pixel, as will be described later. As described with reference to FIG. 5A-FIG. 5D, the error matrix MX defines the weight W (and thus the distribution ratio) of each pixel PX. The processor 110 obtains distribution percentages of the distribution pixels PXe around the pixel of interest PXi according to the error matrix MX, and calculates the sum of the error values of each of the surrounding distribution pixels PXe multiplied by the distribution percentages as the distribution error value Et.

In S404, the processor 110 calculates compensated gradation value Va by adding the distribution error value Et to the input gradation value Vin of the pixel of interest PXi.

In S406, the processor 110 refers to the threshold table data (FIG. 4: S330, FIG. 6) to obtain the threshold values ThBCS(Vin), ThBCM(Vin) and ThBCL(Vin) to be associated with the input gradation value Vin. The processor 110 calculates the dot threshold values ThS, ThM and ThL for the small, medium and large dots, respectively, by adding a random number RND to these threshold values. The processor 110 determines the random number RND for each dot size.

With the random number RND, the possibility of regular dot patterns being formed by the error diffusion process can be reduced (regular dot patterns could become unintentionally conspicuous). The random number RND may be determined, for example, from a range of values greater than or equal to a lower limit and less than or equal to an upper limit. The lower and upper limits are determined experimentally in advance to execute appropriate printing. It is noted that the random number RND is preferably determined such that ThL is greater than or equal to ThM and ThM is greater than or equal to ThS. It is noted that the addition of the random number RND may be omitted.

In S410, the processor 110 determines whether the compensated gradation value Va is greater than the large-dot threshold ThL. When Va is greater than ThL (S410: YES), the processor 110 determines, in S412, the dot formation state of the pixel of interest to be a large dot.

When Va is less than or equal to ThL (S410: NO), the processor 110 determines, in S416, whether the compensated gradation value Va is greater than the medium dot threshold ThM. When Va is greater than ThM (S416: YES), the processor 110 determines, in S418, the dot formation state of the pixel of interest to be a medium dot. Then, the processor 110 proceeds to S428.

When Va is less than or equal to ThM (S416: NO), at S422, the processor 110 determines whether the compensated gradation value Va is greater than the small-dot threshold ThS. When Va is greater than ThS (S422: YES), the processor 110 determines, in S424, the dot formation state of the pixel of interest to be a small dot. Then, the processor 110 proceeds to S428.

When Va is less than or equal to ThS (S422: NO), the processor 110 determines, in S426, the dot formation state of the pixel of interest to be no dots. Then, the processor 110 proceeds to S428.

In S428, the processor 110 obtains the reference gradation value Dr, which is associated with the dot formation state, by referring to the profile obtained in S401.

In S430, the processor 110 calculates the error value Ea of the pixel of interest PXi according to a calculation formula below.

Error value $Ea$=compensated gradation value $Va$−reference gradation value $Dr$ The error value Ea indicates an error that is generated between the reference gradation value Dr, which corresponds to the dot formation state of the pixel of interest PXi, and the compensated gradation value Va of the pixel of interest PXi. The processor 110 stores the error value Ea in the buffer area 125 (FIG. 1). In the buffer area 125, the error value Ea of each pixel calculated in S430 is recorded. The distribution error value Et obtained in S403 is the error value distributed to the pixel of interest PXi according to the error matrix MX using the respective error values Ea of the multiple pixels recorded in the buffer area 125.

With the above, the error diffusion process for one color component of one pixel is completed. The order of comparison between the compensated gradation value Va and the dot threshold is the order of large dot threshold ThL, medium dot threshold ThM, and small dot threshold ThS (i.e., from the larger dot size to the smaller one).

The processor 110 performs the above error diffusion process for all color components of all pixels of the input image. In this way, the processor 110 generates output image data that represents the dot formation state of each color component of each pixel. The processor 110 stores the generated output image data in the storage 115 (e.g., the non-volatile storage device 130). Then, the processor 110 completes the process shown in FIG. 8, i.e., S140 of FIG. 2.

As described above, in the present embodiment, the controlling device 100 performs image processing for printing images. In S135 (FIG. 2), the processor 110 obtains input image data representing the input gradation value Vin for each of the multiple pixels. In S140, the processor 110 performs the halftone process using the input image data to generate output image data that represents the dot formation state of each of the multiple pixels. The halftone process includes S210 and S220 (FIG. 3). That is, the halftone process includes a process of selecting the dot formation state of each of the multiple pixels from among four dot states.

In S220, the processor 110 selects the dot formation state of the pixel of interest PXi from the four dot states. The four dot states include a non-dot state (S426 in FIG. 8), which indicates no dots, and three with-dot states (S412, S418 and S424 in FIG. 8), which indicate dots of sizes different from each other.

In S210 and S220 (FIG. 8: including S401, S402, S406, S410-S426 and S430), the processor 110 calculates three threshold values ThS, ThM and ThL to be associated with the three with-dot states, respectively. In S406, the processor 110 stores the calculated threshold values ThS, ThM and ThL in the storage 115 (e.g., the volatile storage device 120). That is, the processor 110 determines three threshold values, ThS, ThM and ThL, to be associated with each of the three with-dot states. In S404, the processor 110 calculates a composed gradation value Va of the pixel of interest PXi using the input gradation value Vin of the pixel of interest PXi and the error value Et (referred to as the first error value Et) distributed to the pixel of interest PXi from L distribution pixels (L being an integer of 2 or more) located around the pixel of interest PXi. In S410-S426, the processor 110 selects the dot formation state of the pixel of interest PXi by comparing the compensated gradation value Va of the pixel of interest PXi with at least one of the three threshold values. In S430, the processor 110 calculates an error value Ea (referred to as a second error value Ea) of the pixel of interest PXi using the reference gradation value Dr associated with the dot formation state of the pixel of interest PXi from among the four reference tradition values respectively associated with four dot formation states and the compensated gradation value Va of the pixel of interest PXi.

In the process of calculating the threshold values ThS, ThM and ThL (FIG. 8: S401, S402, S406), the processor 110 performs the following processes. The processor 110 calculates the three threshold values ThBCS, ThBCM and ThBCL using the input gradation value Vin of the pixel of interest PXi and multiple parameters including the three reference gradation values VS, VM and VL to be associated with the three with-dot states, respectively (FIG. 7A-FIG. 7D). Then, the processor 110 stores the three threshold values ThBCS, ThBCM and ThBCL in the storage 115 (e.g., the volatile storage device 120). In other words, the processor 110 determines the three threshold values ThBCS, ThBCM and ThBCL. The processor 110 calculates the three threshold values ThS, ThM and ThL using the three threshold values ThBCS, ThBCM and ThBCL, and three random numbers RND. As described above, the processor 110 determines the three threshold values ThS, ThM and ThL using the input gradation value Vin of the pixel of interest PXi and the three reference gradation values VS, VM and VL that are associated with the three with-dot states, respectively. Therefore, the processor 110 can determine, appropriately, the threshold values ThS, ThM and ThL to be used in the halftone process.

Further, as described above with reference to S310 (FIG. 4), S401 (FIG. 8), and the like, the processor 110 performs the halftone process, i.e., generation of the output image data, according to the target printing mode. That is, the print mode is an example of an operating mode for generating output image data. In S115 (FIG. 2), the processor 110 selects a print mode from among four print modes respectively associated with the four profiles PF1-PF4 (FIG. 5A-FIG. 5D). The four print modes differ from each other in one or both of the recording medium type MT and the print resolution RS. Further, the reference gradation values VS, VM and VL are determined individually for each print mode. Therefore, between two print modes, the reference gradation value of one or more dot sizes could be different. For example, between the reference gradation values VS1, VM1 and VL1 of the first profile PF1 and the reference gradation values VS2, VM2 and VL2 of the second profile PF2, the one or more dot size The reference gradation values (e.g., the reference gradation values VS1 and VS2 for the small dots) may be different. As above, the processor 110 can determine the threshold values ThS, ThM and ThL appropriate for each print mode by using one or more reference gradation values that are different among a plurality of print modes.

Further, the storage 115 (the non-volatile storage device 130 in the present embodiment) stores data representing profiles including the reference gradation values VS, VM and VL, and representing a plurality of profiles PF1-PF4 respectively associated with a plurality of print modes. Further, as shown in FIG. 7A, the threshold values ThBCS, ThBCM and ThBCL include the common component ThBC, and the individual components ThBS, ThBM and ThBL. The process of calculating the threshold values ThS, ThM and ThL includes S401 and S406 of FIG. 8. In S401, the processor 110 obtains the data of the profile associated with the target print mode (including reference gradation values VS, VM and VL) from the storage 115. In S406, the processor 110 calculates the common component ThBC using three or more parameters including the three reference gradation values VS, VM and VL (FIG. 7A-FIG. 7D). According to this configuration, the processor 110 can calculate the appropriate threshold values ThS, ThM and ThL by using the profile data obtained from the storage 115.

The selectable multiple print modes include the print mode of the first profile PF1 and the print mode of the second profile PF2, which indicates a second print resolution RS2 different from a first print resolution RS1 of the first profile PF1. The total number L (which is 6 in this case) of the distribution pixels PXe in the first profile PF1 is different from the total number L (which is 12 in this case) of the distribution pixels PXe in the second profile PF2. As such, since the total number L of the distribution pixels PXe varies depending on the print resolution RS, the processor 110 can perform the halftone process that is appropriate for each print resolution RS.

The selectable multiple print modes include the print mode of the first profile PF1 (FIG. 5A) and the print mode of the third profile PF3 (FIG. 5C). The recording medium type MT of the third profile PF3 (in this case, the glossy paper) is different from the recording medium type MT of the first profile PF1 (in this case, the plain sheet). The total number L of the distribution pixels PXe in the first profile PF1 (in this case, 6) is different from the total number L of the distribution pixels PXe in the third profile PF3 (in this case, 10). As above, since the total number L of the distribution pixels PXe varies depending on the recording medium type MT, the processor 110 can perform the halftone process that is appropriate for each recording medium type MT.

FIG. 9 is a flowchart showing a modification of the present embodiment of the threshold table generation process. The only difference from the embodiment shown in FIG. 4 is that the coefficient dMax (FIG. 7C) is determined using the error matrix MX in FIG. 9. In the present embodiment, S313 and S316 of FIG. 9 are inserted between S310 and S320 in FIG. 4. The processes for the other parts of the generation process are the same as those in the corresponding parts of FIG. 4, and the description of the corresponding parts is omitted.

In S313, the processor 110 obtains the error matrix MX with reference to the profile obtained in S310 (FIG. 4). In S316, the processor 110 uses the error matrix MX to determine the coefficient dMax.

FIG. 10A shows an example of a formula for calculating the coefficient dMax. In the present embodiment, the coefficient dMax is obtained by multiplying a particular component Cw by constants (in this case, the constants being 255 and 2). The particular component Cw is a ratio of the sum of the weights W of the reference pixels PXr to the sum of the weights W of the distribution pixels PXe. The reference pixel PXr is a pixel that is determined in advance from among the L distribution pixels PXe. In the error matrices MX1-MX4 in FIG. 5A-FIG. 5D, the reference pixel PXr is indicated by hatching. In the present embodiment, the reference pixel PXr is composed of two pixels adjacent to the pixel of interest PXi. It is noted that the pixels adjacent to the pixel of interest are eight pixels surrounding the pixel of interest.

FIG. 10B and FIG. 10C show examples of calculations of the coefficients dMax. As shown in FIG. 10B, when the first profile PF1 (FIG. 5A) is referred to, the coefficient dMax is 255. When the second profile PF2 is referred to, as shown in FIG. 10C, the coefficient dMax is 148.

Thus, in the present embodiment, the processor 110 determines the three threshold values ThS, ThM and ThL using a plurality of parameters including the coefficients dMax determined based on the L distribution pixels PXe. The plurality of parameters includes the input gradation value Vin and the reference gradation values VS, VM and VL. Therefore, the processor 110 can determine appropriate threshold values ThS, ThM and ThL for the L distribution pixels PXe (and further, the error matrix MX).

The L distribution pixels PXe (FIG. 5A-FIG. 5D) are associated with weights W by means of the error matrix MX. The weight W indicates the weight assigned to an error value when the error value of the distribution pixel PXe is distributed to the pixel of interest PXi. That is, the weight W is an example of a weight of the error value of the distribution pixel PXe relative to the pixel of interest PXi. The coefficient dMax (FIG. 10A) is the particular component Cw multiplied by a coefficient (in this case, 255*2). The particular component Cw is a ratio of the sum of the weights W of the N reference pixels PXr (N=2 in the present embodiment) to the sum of the L weights W of the L distribution pixels PXe. The larger the coefficient dMax increases as the larger this ratio becomes larger. Therefore, the processor 110 can calculate the threshold values ThS, ThM and ThL appropriate for the weights W of respective L distribution pixels PXe (including N reference pixels PXr).

The N reference pixels PXr include one or more pixels adjacent to the pixel of interest PXi. Therefore, the processor 110 can calculate threshold values ThS, ThM and ThL appropriate for the weight W of one or more pixels adjacent to the pixel of interest PXi.

FIG. 11 is a flowchart showing a modification of the present embodiment of the error diffusion process. The only difference from the embodiment in FIG. 8 is that the threshold values ThS, ThM and ThL are limited below the upper limit in the present embodiment. In the present embodiment, S408 and S409 in FIG. 11 are inserted between S406 and S410 in FIG. 8. The processing of the other steps of the error diffusion process is the same as that of the corresponding steps in FIG. 8 (description is omitted).

In S408, the processor 110 determines whether the threshold values ThS, ThM and ThL are greater than corresponding upper limit values ThSMAX, ThMMAX and ThLMAX, respectively. For any threshold value that exceeds the upper limit, the processor 110 sets the threshold value to the upper limit. For threshold values below the upper limit, the processor 110 skips S409 and does not change the threshold value. Then, processor 110 proceeds to S410.

Figure 12:
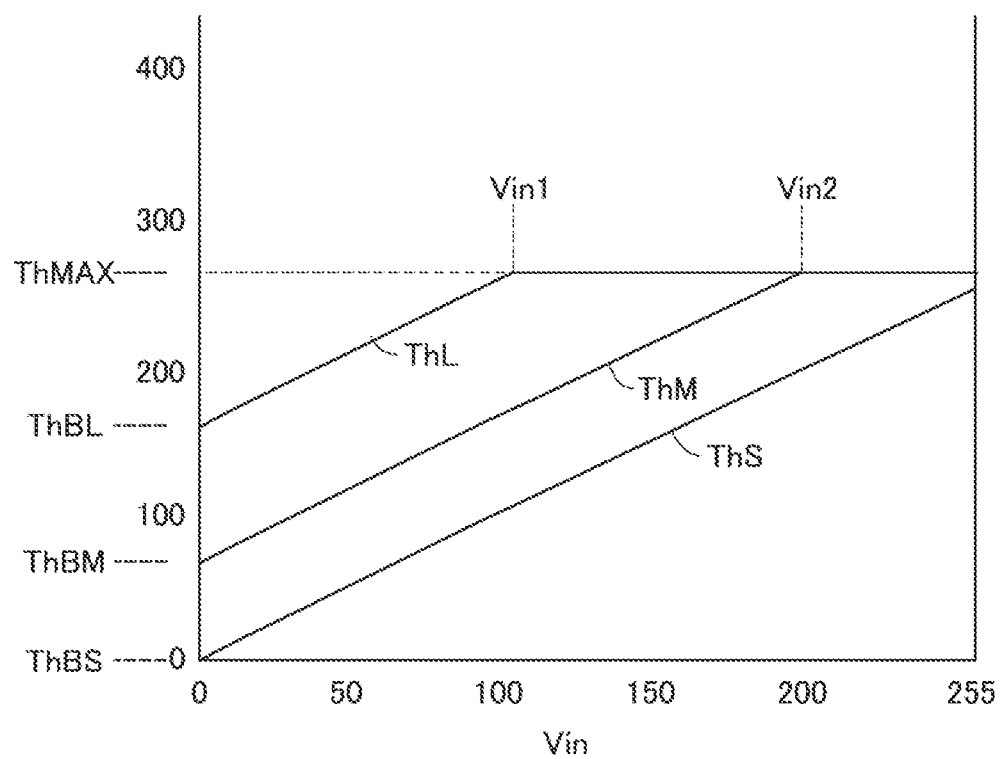
FIG. 12 is a graph showing exemplary threshold values.

FIG. 12 is a graph showing examples of threshold values. The horizontal axis represents an input gradation value Vin, and the vertical axis represents a threshold value. The threshold values ThS, ThM and ThL in FIG. are calculated using the threshold value table in FIG. 6. For simplicity of description, changes due to a random number RND, which is added in S406 of FIG. 8, are omitted. Further, the upper limit will be the same value, ThMAX, regardless of dot size (i.e., ThSMAX=ThMMAX=ThLMAX=ThMAX).

As shown in FIG. 12, when the threshold value is less than or equal to the upper limit ThMAX, the threshold values ThS, ThM and ThL are the same as the threshold values ThBCS, ThBCM and ThBCL in the threshold value table, respectively. When the input gradation value Vin increases from zero, the large-dot threshold value ThL becomes ThMAX at the first input gradation value Vin1. When Vin>Vin1, ThL=ThMAX regardless of the input gradation value Vin. When the input gradation value Vin increases from zero, the medium dot threshold value ThM becomes ThMAX at the second input gradation value Vin2. When Vin>Vin2, ThM=ThMAX regardless of the input gradation value Vin. In the example shown in FIG. 12, the small dot threshold value ThS is less than or equal to the upper limit ThMAX, regardless of the input gradation value Vin. In the present embodiment, a random number RND is added to each of the threshold values ThBCS, ThBCM and ThBCL in S406 of FIG. 8. When the threshold value becomes greater than the upper limit ThMAX as a result of the addition of the random number RND, the processor 110 sets the threshold value to the upper limit in S409 (FIG. 11). In other words, when the addition of the random number RND would cause the threshold value to be greater than the upper limit ThMAX, the processor 110 rewrites the threshold value to the upper limit in S409 (FIG. 11).

As described above, in the present embodiment, the processor 110 limits the large dot threshold value ThL to be associated with the largest size with-dot state among the three with-dot states, to less than or equal to the upper limit ThMAX. Therefore, the processor 110 can determine a threshold value ThL that realizes an appropriate formation of the large dots. For example, if the large dot threshold value ThL is excessively large, it is difficult that the compensated gradation value Va exceeds the large dot threshold value ThL in S410 (FIG. 8), and therefore large dots are difficult to be formed. As a result, images containing unintentionally thin portions could be printed. According to the present embodiment, the possibility of such a defect is reduced.

In the present embodiment, the processor 110 limits the medium dot threshold value ThM, in addition to the large dot threshold value ThL, to the upper limit ThMAX or less. Therefore, the processor 110 can reduce the possibility of an image containing unintentionally thin portions with no medium dots being printed. It is noted that the medium dot threshold value ThM, like the small dot threshold value ThS, may be configured to be less than or equal to the upper limit ThMAX, regardless of the input gradation value Vin.

It is preferable that the processor 110 limits one or more threshold values among the multiple threshold values for the multiple dot sizes, including the threshold value for the largest dot size, to less than or equal to the upper limit. In this way, the possibility of an image containing unintentionally thin portions being printed is reduced. It should be noted that the upper limit may be the same for multiple dot sizes, and may be different for the different dot sizes. For example, the larger the dot size is, the larger the upper limit may be. Further, the present embodiment may be applied to the embodiments shown in FIG. 9 and FIG. 10.

In each of the above embodiment and modifications of the present embodiments, the dot sizes available for printing are not limited to three sizes (i.e., the small, medium, and large sized), but may be two or more of various sizes. For example, four sizes (e.g., the small, medium, large sizes, and an extra-large sizes) may be available. In such a case, the halftone process may be modified to handle extra-large size dots in addition to the small, medium, and large size dots. For example, in the process shown in FIG. 8, in S406, the processor 110 determines a threshold value ThLL for the extra-large dots in addition to the threshold values ThS, ThM and ThL. The processor 110 compares the compensated gradation value Va with the extra-large dot threshold value ThLL before comparing the compensated gradation value Va with the large dot threshold value ThL (S410). When Va>ThLL, the processor 110 determines the dot formation status of the pixel of interest to be the extra-large dot, and moves to S428. When the compensated gradation value Va is less than or equal to the extra-large threshold value ThLL, the processor 110 proceeds to S410.

The extra-large threshold value ThLL may be determined in a similar manner as the other threshold values ThS, ThM and ThL are determined. FIGS. 13A-13D show examples of formulas to calculate the threshold values. In the present embodiment, parts of the formulas shown in FIGS. 7A-7D are modified to calculate the extra-large threshold value ThBCLL. The modifications are indicated below.

As shown in FIG. 13A, the extra-large threshold value ThBCLL(Vidx) is expressed as a sum of a common component ThBC(Vidx) and an individual component ThBLL. As shown in FIG. 13B, the individual component ThBLL is the same as the reference gradation value VL. In the present embodiment, the individual components ThBS, ThBM, ThBL and TkhBLL are same as the reference gradation values (0, VS, VM and VL) for dot sizes one step smaller.

As shown in FIG. 13C, the common component ThBX (Vidx) is calculated by multiplying a coefficient dMax to a sum of four terms T1$d$, T2$d$, T3$d$ and T4$d$. The four terms T1$d$, Td2, Td3 and Td4 are set as described below, referring to the terms T1, T2, T3 and T4 shown in FIG. 7C.

(1) The first term T1$d$ is calculated by multiplying the first term T1 with a ratio RtL.
(2) The second term T2$d$ is calculated by multiplying the second term T2 with the ratio RtL.
(3) The third term T3$d$ is calculated by multiplying the third term T3 with the ratio RtL.
(4) The fourth term T4$d$ is expressed as a product of (1−RtL) and a power of the index ratio (Vidx/255) (the exponent is a third exponent GM3).

As shown in FIG. 13D, the third ratio RtL is twice the ratio of the reference gradation values VL to VLL (i.e., VL/VLL). The reference gradation value VLL is a gradation value corresponding to the thickness of the extra-large dot. The third exponent GM3 is a square root of a ratio of reference gradation values VLL to VL (VLL/VL).

As described above, the threshold values ThBCS, thBCM, ThBCL and the ThBCLL of the present embodiment are calculated in a manner the same as the threshold values ThBCS, ThBCM and ThBCL in FIGS. 7A-7D. The threshold values ThBCS, ThBCM, ThBCL and ThBCLL in the present embodiment have the same characteristics as the threshold values shown in FIGS. 7A-7D. For example, the exponents (1, GM1, GM2, GM3) of the power of the index ratio (Vidx/255) in the four terms T1$d$, T2$d$, T3$d$ and T4$d$ can vary the common component ThBC according to the index Vidx, similar to the so-called gamma correction tone curve.

Parameters in the formulas (e.g., the exponents GM1, GM2, GM3, and the reference gradation values VS, VM, VL and VLL) could vary depending on the print mode. For the four terms T1$d$, T2$d$, T3$d$ and T4$d$, the coefficients that are multiplied to the power of the index ratio (Vidx/255) are (RtS*RtM*RtL), ((1−RtS)*RtM*RtL), ((1−RtM)*RtL), and (1−RtL). These four coefficients are configured so that the sum of the four coefficients is 1. Therefore, the sum of the four terms T1$d$, T2$d$, T3$d$ and T4$d$ can be calculated as an appropriate value like the so-called gamma correction.

It is noted that the present embodiment may be applied to the embodiment shown in FIG. 9 and FIG. 10A, or the embodiment shown in FIG. 11 and FIG. 12.

Modifications (1) The configuration of the error matrix MX is not necessarily limited to the configuration of the error matrices MX1-MX4 shown in FIG. 5A-FIG. 5D, but may be of various configurations that determine the weight W of each of the multiple pixels surrounding the pixel of interest PXi. For example, available multiple print modes may include a "high quality mode" and a "fast mode." In such a case, the total number L of the distribution pixels PXe in the error matrix MX should be larger in the "high quality mode" than in the "high speed mode".

(2) In the embodiment shown in FIG. 9 and FIG. 10A, reference pixels PXr used for calculating the coefficient dMax may include the distribution pixels PXe apart from the pixel of interest PXi in addition to the distribution pixels PXe adjacent to the pixel of interest PXi. Further, the reference pixels PXr may be composed by only the distribution pixels PXe apart from the pixel of interest PXi. In any case, the total number N of the reference pixels PXr may be various numbers greater than or equal to 1 and less than or equal to the total number L of the distribution pixels PXe.

The formulas for calculating the coefficient dMax may be any other formulas instead of the formulas shown in FIG. 10A. For example, the coefficient dMax may be calculated by multiplying the ratio of the total number N of the reference pixels PXr to the total number L of the distribution pixels PXe (N/L) by a constant. Since the larger the coefficient dMax is, the larger the dot threshold values ThS, ThM, ThL and ThLL are, dots are less likely to be formed. For the same coefficient dMax, the more the total number L of distribution pixels is, the less likely it is that a dot will be formed, since the error is distributed from more pixels to the pixel of interest PXi. Therefore, for ease of dot formation, the coefficient dMax should be smaller when the total number L of the distribution pixel PXe is larger.

The method of determining the coefficient dMax may be a variety of other methods instead of the method of determining the same based on the L distribution pixels PXe (e.g., FIG. 10A). For example, the processor 110 may allow the user to adjust the coefficient dMax.

(3) At least some of the data used to generate the threshold value table (FIG. 3: S210, FIG. 4) may be prepared in advance. For example, common component data representing the correspondence between the common component ThBC and the input gradation value Vin may be stored in advance in the storage 115 (e.g., the non-volatile storage device 130). In such a case, in S320 of FIG. 4, the processor 110 may generate the threshold value table by using the common component data. Further, threshold value table data for each printing mode may be stored in advance in the storage 115 (e.g., the non-volatile storage device 130). In such a case, in S210 of FIG. 3, instead of generating the threshold value table, the processor 110 obtains threshold value table data corresponding to the target printing mode from the storage 115 (e.g., from the non-volatile storage device 130). In S406 of FIG. 8, the processor 110 determines the threshold values (e.g., ThS, ThM, ThL) using the input gradation value Vin and the threshold value table. Also in such a case, the processor 110 indirectly uses multiple reference gradation values (e.g., VS, VM, VL) via the threshold value table to determine the threshold value. In this manner, instead of using the multiple reference gradation values directly, the processor 110 may use the threshold values indirectly via other parameters by determining the threshold values) may be used indirectly via other parameters by determining the threshold value using other parameters determined using the multiple reference gradation values.

(4) The total number Q of the multiple with-dot states, which indicate dots of different sizes, may be various numbers of two or more. For example, two types of with-dot states, i.e., the medium dot and the large dot, may be available.

(5) In the examples of FIGS. 7A-7D and FIGS. 13A-13D, the individual components ThBS, ThBM, ThBL and ThBLL, the ratios RtS, RtM and RtL, and the indices GM1, GM2 and GM3 are all determined from a set of reference gradation values (e.g., "VS, VM and VL", or "VS, VM, VL and VLL"). That is, the common component ThBC (Vi) is determined solely from the input gradation value Vin, the set of reference gradation values, and the coefficient dMax. As above, in the embodiments using the calculation formulas of FIGS. 7A-7D and FIGS. 13A-13D, the processor 110 can easily determine the set of threshold values (e.g., "ThS, ThM and ThL" or "ThS, ThM, ThL and ThLL") using the input gradation value Vin, the set of reference gradation values, and the coefficient dMax.

The formulas for calculating the threshold values may be various other formulas instead of the formulas shown in FIGS. 7A-7D and FIGS. 13A-13D. For the calculation of the threshold values, other parameters may be used in addition to the input gradation values Vin and the set of reference gradation values. For example, the indices GM1, GM2 and GM3 may be determined independently of the reference gradation value. Further, the common component ThBC may be omitted and a calculation formula may be defined for each dot size. In either case, it is preferable that the formula for calculating the threshold value is configured such that the larger the input gradation value Vin, the larger the threshold value.

(6) Multiple print modes, i.e., multiple operating modes of the halftone process, are not necessarily limited to the modes of profiles PF1-PF4 shown in FIG. 5A-FIG. 5D, but may include a variety of modes. The available multiple operating modes may include two "type-one" operating modes between which one or both of the recording medium type MT and the print resolution RS are different. It is preferable that the reference gradation values (e.g., the reference gradation value VS) of one or more dot formation states (e.g., the reference gradation value VS) are different between the two "type-one" operation modes. According to the above configuration, the processor 110 can perform the halftone process suitable for one or both of the recording medium type MT and the print resolution RS. It should be noted that the reference gradation values for all the dot formation states may be the same for the two "type-one" operating modes.

The available multiple operating modes may include two "type-two" operating modes with different print resolutions RS. It is preferable that the total number L of the distribution pixels PXe are different between the two type-two operation modes. According to this configuration, the processor 110 can perform the halftone process suitable for the printing resolution RS. It is preferable that the higher the printing resolution RS is, the larger the total number L is. According to the above configuration, when the printing resolution RS is high, a possibility that an area (unit being, for example, square millimeters) of the distribution area of the distribution pixel PXe on the printing sheet is too small can be reduced. However, the total number L may be common to the two type-two operating modes.

The available multiple operating modes may include two "type-three" operating modes with different recording medium types MT. Further, the total number L of the distribution pixels PXe should be different between the two type-three operating modes. According to this configuration, the processor 110 can perform the halftone process suitable for the recording medium type MT. However, the total number L may be common to the two type-three operating modes.

In any case, the total number of available operating modes may be any number greater than or equal to one. For example, the profiles PF2 and PF4 may be omitted in the embodiment of FIG. 5A-FIG. 5D. Further, the processor 110 may generate new profiles (and thus operating modes) in accordance with user instructions.

(7) The processor 110 may select an operating mode without using user instructions. For example, the print engine 200 may have a storage that stores printing sheets and a printing sheet identification unit that identifies a type of the printing sheet. A configuration of the printing sheet identification unit may be of various configurations that can identify the type of the printing sheet. For example, the printing sheet identification unit may include a light source configured to irradiate light onto the printing sheet and a sensor configured to measure an intensity of the reflected light from the printing sheet. The processor 110 may determine that the recording medium type MT is the plain sheet if the intensity of the reflected light is less than or equal to a particular threshold value, and may determine that the recording medium type MT is the Glossy Paper if the intensity of the reflected light is greater than the threshold value. Then, the processor 110 may select the operating mode to be associated with the recording medium type MT.

(8) The configuration of the print engine 200 may be various other configurations instead of the configuration described in FIG. 1. For example, the print engine 200 may be configured such that a recording medium moves with respect to a fixed print head. Available printing materials may be one or more arbitrary printing materials (e.g., printing materials of three colors of CMY (cyan, magenta and yellow), printing materials of two colors of KY (black and yellow), a printing material of one color of K (black), etc.). The printing material is not necessarily limited to ink, but can be any printing material including coloring material (e.g., toner).

(9) In each of the above embodiments and modifications, the controlling device 100 of the printer 600 is an example of an image processor that uses input image data to generate output image data. The configuration of the image processor is not limited to the above configuration, but may be of various other configurations. For example, the process of S110-S130 in FIG. 2 may be performed by another device (e.g., another computer connected to the printer 600) connected to an image processing device (e.g., the controlling device 100). Further, the image processing device that generates the output image data using the input image data may be an external device (e.g., a computer) connected to the printer 600. In this case, the process of S150-S160 may be performed by the image processing device or the printer 600.

Multiple devices (e.g., computers) that can communicate with each other via a network may share some of the functions of image processing by the image processing device and, as a whole, provide the functions of image processing (a system with these devices corresponds to an image processing device).

In each of the above embodiments, a part of the configuration realized by hardware may be replaced with software, or conversely, a part or all of the configuration realized by software may be replaced with hardware. For example, the function of the error diffusion process (S220) in FIG. 3 may be realized by dedicated hardware circuitry.

Further, when some or all of the functions of the present disclosure are realized by computer programs, the programs can be provided in a form stored in a computer-readable recording medium (e.g., a non-transitory recording medium). The programs can be used in a state where they are stored in a recording medium (computer-readable recording medium) the same as or different from the recording medium in which they were stored when provided. The "computer-readable recording medium" is not limited to a portable recording medium such as a memory card or a CD-ROM, but can also include an internal storage device in a computer such as various ROMs, or an external storage device connected to a computer (e.g., a hard disk drive).

The above-described embodiments and modifications may be combined as appropriate. Further, the above-described embodiments and modifications are for the purpose of facilitating understanding of the disclosure and are not intended to limit aspects of the present disclosure. The configurations according to aspects of the present disclosure may be modified and/or improved without departing from aspects of the present disclosure, rather equivalents of the configurations described above are included in aspects of the present disclosure.

What is claimed is:

1. An image processing device comprising a controller;
wherein the controller is configured to perform:
    obtaining input image data representing an input gradation value for each of multiple pixels; and
    generating output image data representing a dot formation state for each of the multiple pixels by executing a halftone process with respect to the input image data,
wherein the halftone process includes a state selecting process of selecting, from among Q+1 dot states, the dot formation state of a pixel of interest among the multiple pixels, the Q being an integer of 2 or more,
wherein the Q+1 dot states include a non-dot state indicating no dots and Q with-dot states indicating dots of sizes different from each other,
wherein the state selecting process includes:
    a threshold determining process of determining Q threshold values to be associated with the Q with-dot states;
    calculating a compensated gradation value of the pixel of interest using an input gradation value of the pixel of interest and a first error value indicating an error value distributed to the pixel of interest from L distribution pixels located around the pixel of interest, the L being an integer of 2 or more;
    selecting the dot formation state of the pixel of interest by comparing the compensated gradation value of the pixel of interest and at least one of the Q threshold values; and
    calculating a second error value indicating an error value of the pixel of interest using a reference gradation value to be associated with the dot formation state of the pixel of interest from among Q+1 reference gradation values and the compensated gradation value of the pixel of interest, the Q+1 reference gradation values to be associated with the Q+1 dot states,
wherein, in the threshold determining process, the Q threshold values are determined using multiple parameters including the input gradation values of the pixel of interest and Q reference gradation values to be associated with the Q with-dot states.

2. The image processing device according to claim 1,
wherein, in the threshold determining process, the Q threshold values are determined using the multiple parameters including a coefficient determined based on the L distribution pixels.

3. The image processing device according to claim 2,
wherein a weight of error value of a distribution pixel with respect to the pixel of interest is associated with each of the L distribution pixels, and
wherein the coefficient increases as a ratio of sum of N weights of N reference pixels to sum of L weights of the L distribution pixels becomes larger, the N reference pixels being N distribution pixels determined from among the L distribution pixels in advance, the N being an integer greater than or equal to 1 and less than or equal to L.

4. The image processing device according to claim 3,
wherein the N reference pixels include at least one pixel adjacent to the pixel of interest.

5. The image processing device according to claim 1, wherein the controller is further configured to perform
selecting an operation mode to generate the output
image data from among multiple print modes,
the multiple print modes including a first print mode and a
second print mode, setting of a recording medium type
for printing or setting of resolution of the output image
data being different between the first print mode and the
second print mode, and
wherein one or more reference gradation values among
the Q reference gradation values corresponding to the
Q with-dot states, are different between the first print
mode and the second print mode.

6. The image processing device according to claim 5, further comprising a storage device configured to store multiple pieces of reference gradation value data to be associated with the multiple print modes, the multiple pieces of reference gradation value data representing the Q reference gradation values,
wherein each of the Q threshold values includes a common component common to the Q threshold values and an individual component different among the Q threshold values,
wherein the threshold determining process comprises:
obtaining, from the storage device, reference gradation value data to be associated with the print mode selected by the selecting; and
calculating the common component using more than Q parameters among the multiple parameters, the more than Q parameters including the Q reference gradation values represented by the obtained reference gradation value data.

7. The image processing device according to claim 1,
wherein the threshold determining process includes limiting a threshold value associated with a with-dot state for a largest dot size among the Q with-dot states to less than or equal to an upper limit.

8. The image processing device according to claim 1,
wherein the controller is further configured to perform
selecting an operation mode to generate the output image data from among multiple print modes, the multiple print modes including a first print mode and a second print mode, resolution of the output image data being different between the first print mode and the second print mode, and
wherein a number L of the L distribution pixels in the first print mode is different from a number L of the L distribution pixels in the second print mode.

9. The image processing device according to claim 1,
wherein the controller is further configured to perform
selecting an operation mode to generate the output image data from among multiple print modes, the multiple print modes including a first print mode and a second print mode, a recording medium type for printing being different between the first print mode and the second print mode, and
wherein a number L of the L distribution pixels in the first print mode is different from a number L of the L distribution pixels in the second print mode.

10. An image processing method for printing an image, comprising;
obtaining input image data representing an input gradation value for each of multiple pixels; and
generating output image data representing a dot formation state for each of the multiple pixels by executing a halftone process with respect to the input image data,
wherein the halftone process includes a state selecting step of selecting, from among Q+1 dot states, the dot formation state of a pixel of interest among the multiple pixels, the Q being an integer of 2 or more,
wherein the Q+1 dot states include a non-dot state indicating no dots and Q with-dot states indicating dots of sizes different from each other,
wherein the state selecting step includes:
a threshold determining process of determining Q threshold values to be associated with the Q with-dot states;
calculating a compensated gradation value of the pixel of interest using an input gradation value of the pixel of interest and a first error value indicating an error value distributed to the pixel of interest from L distribution pixels located around the pixel of interest, the L being an integer of 2 or more;
selecting the dot formation state of the pixel of interest by comparing the compensated gradation value of the pixel of interest and at least one of the Q threshold values; and
calculating a second error value indicating an error value of the pixel of interest using a reference gradation value to be associated with the dot formation state of the pixel of interest from among Q+1 reference gradation values and the compensated gradation value of the pixel of interest, the Q+1 reference gradation values to be associated with the Q+1 dot states,
wherein, in the threshold determining process, the Q threshold values are determined using multiple parameters including the input gradation values of the pixel of interest and Q reference gradation values to be associated with the Q with-dot states.

11. A non-transitory computer-readable recording medium containing computer-executable instructions executable by a computer of an image processing device configured to print an image, the computer-executable instructions causing, when executed by the computer, the image processing device to perform:
obtaining input image data representing an input gradation value for each of multiple pixels; and
generating output image data representing a dot formation state for each of the multiple pixels by executing a halftone process with respect to the input image data,
wherein the halftone process includes a state selecting process of selecting, from among Q+1 dot states, the dot formation state of a pixel of interest among the multiple pixels, the Q being an integer of 2 or more,
wherein the Q+1 dot states include a non-dot state indicating no dots and Q with-dot states indicating dots of sizes different from each other,
wherein the state selecting process includes:
a threshold determining process of determining Q threshold values to be associated with the Q with-dot states;
calculating a compensated gradation value of the pixel of interest using an input gradation value of the pixel of interest and a first error value indicating an error value distributed to the pixel of interest from L distribution pixels located around the pixel of interest, the L being an integer of 2 or more;
selecting the dot formation state of the pixel of interest by comparing the compensated gradation value of the pixel of interest and at least one of the Q threshold values; and
calculating a second error value indicating an error value of the pixel of interest using a reference gradation value to be associated with the dot formation state of the pixel of interest from among Q+1 reference gradation values and the compensated gradation value of the pixel of interest, the Q+1 reference gradation values to be associated with the Q+1 dot states, wherein, in the threshold determining process, the Q threshold values are determined using multiple parameters including the input gradation values of the pixel of interest and Q reference gradation values to be associated with the Q with-dot states.

* * * * *